United States Patent
Kerr

[15] 3,649,088
[45] Mar. 14, 1972

[54] BEARINGS
[72] Inventor: John Kerr, Glasgow, Scotland
[73] Assignee: Henry Balfour & Company Limited, Leven, Scotland
[22] Filed: Dec. 28, 1970
[21] Appl. No.: 101,513

[30] Foreign Application Priority Data
    Jan. 1, 1970   Great Britain.............................501/70

[52] U.S. Cl.................................................308/9
[51] Int. Cl. ............................................F16c 17/16
[58] Field of Search..............................308/9, 160

[56] References Cited
    UNITED STATES PATENTS
    3,466,952   9/1969   Greenberg et al.........................308/9

*Primary Examiner*—Edgar W. Geoghegan
*Assistant Examiner*—Frank Susko
*Attorney*—Young & Thompson

[57] ABSTRACT

A bearing for a shaft is designed such that relative deflections between the shaft and bearing axis may be accommodated and includes a bush in which the shaft rotates the bush being resiliently mounted in a bearing mounting by resilient means located adjacent the ends of the bush, one end of the bush having a flange fixed thereto, a bearing land on the flange cooperating with a corresponding land on a collar of the shaft. Passages each including a restriction are formed through the bush and its flange and are supplied with gas at above ambient pressure.

13 Claims, 1 Drawing Figure

Patented March 14, 1972
3,649,088
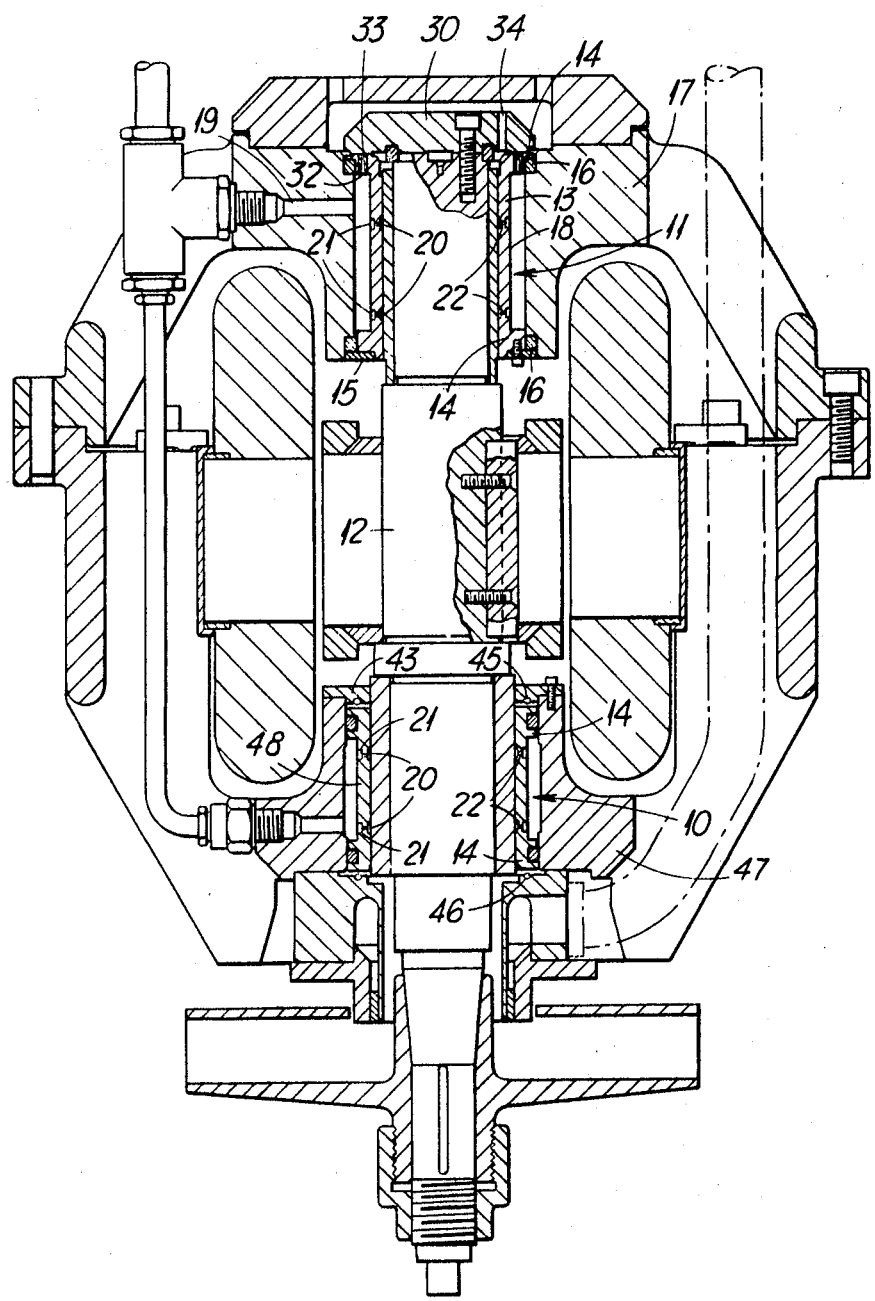
Inventor
JOHN KERR
By Young + Thompson
Attorneys

BEARINGS

The present invention concerns improvements in or relating to bearings and more particularly to gas-lubricated bearings which are mounted by resilient means, such bearings being referred to hereinafter as "flexible bearings."

According to the present invention there is provided a flexible bearing for a shaft having a thrust collar, said bearing including a cylindrical bush, an external flange rigidly attached at an end of the bush to provide a bearing land co-operable with a corresponding bearing land on said thrust collar, a plurality of passages extending through the bush communicating with the surface of the bush facing the shaft and a plurality of passages extending through the flange communicating with the bearing land thereof, the passages serving to convey lubricating gas to said surface and land, the ratio of the external radius of the collar bearing land to the internal radius of the bush being not greater than 1.5:1.

One embodiment of the present invention will now be described by way of example, with reference to the accompanying drawing which shows an atomizer and electric motor combination in section. Two bearings 10,11 are supplied to support the shaft 12 of an electrically driven atomizer. The shaft 12 is supported with its longitudinal axis vertical and as the arrangement of the electrical components and atomizing components do not concern the present invention, they will not be described in detail.

The bearing 11 adjacent the upper end of the shaft 12 is a flexible hydrostatic air bearing and includes a cylindrical bush 13 whose internal diameter is slightly greater than the external diameter of the portion of shaft 12 passing through the bush such that the shaft may rotate within the bush. At either end of the bush 13 there is provided an outstanding flange 14. The upper flange 14 is stepped while the lower flange has an annular plate 15 bolted thereto to form a step. Each step serves to locate a ring 16 of a resilient material. A bearing member 17 having a cylindrical passage formed therethrough is provided also, the bush being mounted within the passage which has end portions of increased diameter which combine with the stepped upper flange 14 and the plate 15 on the lower flange to locate the rings 16. With this arrangement it is possible for the axis of the bush to deflect, the resilience of the rings 16 mounting the bush allowing for this deflection.

Owing to the close fit of the rings 16 against the internal walls of the passage of the member 17, a substantially annular chamber 18 is defined by the internal wall of the passage, the external wall of the bush and the flanges and rings at either end.

Gas, for example air, under pressure is supplied through an inlet 19 to this chamber 18 and is distributed to a plurality of pockets 20 formed on the internal surface of the bush 13 by corresponding radial passages 21, each formed with a restriction 22 and passing from the outer to the inner surface of the bush 13.

A thrust collar 30 of a diameter greater than the outside diameter of the shaft 12 is attached to the shaft at its upper end, the bottom face 31 of this collar providing a bearing land co-operable with a corresponding land provided on the outer face of the upper flange 14 of the bearing bush 13. Lubrication is provided between the collar 30 and flange 14 by gas, for example air, under pressure supplied to the chamber 18 by inlet 19, the gas thereafter passing through the flange 14 by way of a plurality of small diameter passages 32, the axes of which are parallel to the shaft axis each including a restriction 33. The lubrication gas, for example air, escaping from the contact surface of the thrust collar 30 inwards and the gas escaping from the clearance between the bush 13 and the shaft 12 is vented through the thrust collar by at least two symmetrically positioned axial passages 34 extending therethrough.

The outer diameters of the bearing lands on the collar and flange ($R_1$) are substantially equal to the outer diameter of the collar and flange respectively and are greater than the inside diameter of the bush 13 ($R_3$). The inner diameters of the bearing lands ($R_2$) usually are between $R_1$ and $R_3$.

The diameter of the shaft 12, and consequently the inside diameter of the bush $R_3$ is determined by a number of factors which are not related to the geometry of the bearing, for example, the horsepower of the motor.

It has been found that for satisfactory operation the ratio $R_1/R_3$ should not be greater than 1.5.

The ideal circumferential distance between the axes of the passages 32 is $R_1 - R_2$.

$$n = \frac{2\pi \left( \frac{R_1 + R_2}{2} \right)}{R_1 - R_2}$$

Thus the ideal number of holes $$= \pi \left( \frac{R_1 + R_2}{R_1 - R_2} \right)$$

It is also specified that the ratio of the actual number of holes to the ideal number of holes should be not less than 0.8.

The conditions set forth above result in a thrust bearing in which the bearing land outer diameter is smaller than that normally encountered. Thus, the outside diameter of the bush is correspondingly smaller and its mass and lateral moment of inertia are less so that it is more capable of following shaft movement in conditions of conical vibration and coping with larger dynamic unbalanced forces, and film-whirl if these occur.

The lower bearing 10 is similar in construction and operation to the upper bearing 11 although no thrust bearing is provided.

At its upper end the lower bearing 10 has a keep-plate 43 attached to bearing member 47 the shaft passing through this plate. The bearing bush 48 of the lower bearing 10 has radial passages 21 with restrictors 22 leading to pockets 20 formed in its internal surface, similar to those on the top bearing bush 13. A ring 45 is mounted in co-operation with the lower face of keep-plate 43. A similar arrangement is provided at the lower end of the bearing 10, where a ring 46 is provided, the rings 45,46 being spaced from the outer faces of the flanges 14 of the lower bearing in normal operation.

I claim:
1. A flexible bearing for a shaft having a thrust collar, said bearing including a cylindrical bush, an external flange rigidly attached at an end of the bush to provide a bearing land co-operable with a corresponding bearing land on said thrust collar, a plurality of passages extending through the bush communicating with the surface of the bush facing the shaft and a plurality of passages extending through the flange communicating with the bearing land thereof, the passages serving to convey lubricating gas to said surface and land, the ratio of the external radius of the collar bearing land to the internal radius of the bush being not greater than 1.5:1 and the ratio of the actual number of passages extending through the flange to the calculated number of passages being not less than 0.8:1 where the calculated number of passages

$$n = \pi \left( \frac{R_1 + R_2}{R_1 - R_2} \right)$$

and where $R_1$ and $R_2$ are the outer and inner diameters of the bearing land on the bush and thrust collar respectively.

2. A flexible bearing as claimed in claim 1, in which rings of a resilient material are provided at each end of the bush, a bearing mounting being provided also to co-operate with said rings to resiliently support the bush.

3. A flexible bearing as claimed in claim 2, in which an external flange is provided at each end of the bush and said rings are located on said flanges.

4. A flexible bearing as claimed in claim 3, in which the bearing mounting has a cylindrical passage formed therein this passage accommodating the bearing bush and having a diameter greater than the diameter of the bush such that the mounting with the bush, flanges and the rings defines a chamber.

5. A flexible bearing as claimed in claim 4, in which the cylindrical passage has portions of increased diameter to accommodate the rings and prevent axial movement thereof.

6. A flexible bearing as claimed in claim 4, in which an inlet to said chamber is provided in the bearing mounting, said inlet being in communication with a source of gas above ambient pressure.

7. A flexible bearing as claimed in claim 6, in which the gas is air.

8. A flexible bearing as claimed in claim 1, in which each passage extending through the bush includes a restriction.

9. A flexible bearing as claimed in claim 1, in which each passage extending through the flange includes a restriction.

10. A flexible bearing as claimed in claim 1, in which the outside diameter of the thrust collar is substantially equal to the outside diameter of the collar bearing land.

11. A flexible bearing as claimed in claim 1, in which the outside diameter of the flange is substantially equal to the outside diameter of the bearing land thereon.

12. A flexible bearing as claimed in claim 1, in which at least one passage is provided through the thrust collar.

13. A flexible bearing as claimed in claim 1, in which the inside diameter of the bearing lands is intermediate the inside diameter of the bush and the outside diameter of the bearing lands.

* * * * *